US012566310B2

(12) United States Patent
Kim et al.

(10) Patent No.: US 12,566,310 B2
(45) Date of Patent: Mar. 3, 2026

(54) ACTUATOR FOR DRIVING ZOOM

(71) Applicant: JAHWA ELECTRONICS CO., LTD.,
Cheongju-si (KR)

(72) Inventors: Hee Seoung Kim, Seoul (KR); Kyu Min Lee, Bucheon (KR)

(73) Assignee: JAHWA ELECTRONICS CO., LTD.,
Cheongju-si (KR)

( * ) Notice: Subject to any disclaimer, the term of this patent is extended or adjusted under 35 U.S.C. 154(b) by 738 days.

(21) Appl. No.: 17/693,436

(22) Filed: Mar. 14, 2022

(65) Prior Publication Data

US 2022/0317412 A1     Oct. 6, 2022

(30) Foreign Application Priority Data

Mar. 31, 2021    (KR) ........................ 10-2021-0042337

(51) Int. Cl.
    *G02B 7/105*       (2021.01)
    *G02B 7/02*        (2021.01)

(52) U.S. Cl.
    CPC ............. *G02B 7/105* (2013.01); *G02B 7/021* (2013.01)

(58) Field of Classification Search
None
See application file for complete search history.

(56) References Cited

U.S. PATENT DOCUMENTS

2022/0229347 A1 * 7/2022 Kim ...................... H04N 23/54

FOREIGN PATENT DOCUMENTS

| | | | | |
|---|---|---|---|---|
| JP | 5899089 | B2 | 4/2016 | |
| KR | 2018015966 | A * | 2/2018 | ............. G02B 7/021 |
| KR | 20200125221 | A | 11/2020 | |
| KR | 2021011269 | A * | 2/2021 | ........... G02B 27/646 |
| WO | WO-2020009085 | A1 * | 1/2020 | |
| WO | WO-2020218884 | A1 * | 10/2020 | ............. G03B 13/36 |

* cited by examiner

*Primary Examiner* — William R Alexander
*Assistant Examiner* — Mackenzi Waddell
(74) *Attorney, Agent, or Firm* — Bayramoglu Law Offices LLC

(57) ABSTRACT

An actuator for driving zoom includes a first carrier, wherein the first carrier includes a first mounter and a first lens assembly is mounted on the first mounter, a first supporting part provided on a first side of the first mounter and extending in a first direction, and a first guider provided on a second side of the first mounter and extending in the first direction. A second carrier includes a second mounter, wherein a second lens assembly is mounted on the second mounter, a second supporting part provided on a first side of the second mounter and extending in a second direction opposite to the first direction, and a second guider provided on a second side of the second mounter and extending in the second direction. A first passage provided between the first mounter and the first supporting part and the second guider is inserted into the first passage.

12 Claims, 7 Drawing Sheets

ACTUATOR FOR DRIVING ZOOM

CROSS-REFERENCE TO THE RELATED APPLICATIONS

This application is based upon and claims priority to Korean Patent Application No. 10-2021-0042337, filed on Mar. 31, 2021, the entire contents of which are incorporated herein by reference.

TECHNICAL FIELD

The present invention relates to an actuator for driving zoom, and more particularly, to an actuator for driving zoom capable of preventing collision due to mutual interference between two carriers by limiting the separation distance between the two carriers.

BACKGROUND

As hardware technology for image processing develops and user needs for image shooting increase, functions such as auto focus (AF) and optical image stabilization (OIS) are being implemented in camera modules mounted on mobile terminals such as mobile phones and smartphones as well as independent camera devices.

In addition, recently, an actuator for a zoom lens capable of variously changing the size of a subject by adjusting the focal length through zoom-in and zoom-out functions, etc. has been disclosed, and an actuator that implements a zoom function in more various ways by applying a mutual positional relationship of a plurality of lenses (lens assembly) in combination according to an embodiment has been also disclosed.

In the case of such an actuator for a zoom lens, the movement distance (also referred to as a stroke) of the zoom lens moving in the optical axis direction is extended or expanded than that of a general lens, so it should be designed to secure the driving force accordingly.

However, in the case of a conventional actuator, a physical structure for driving a carrier is designed in a form that is implemented simply in plurality so that an independent movement space of each of the plurality of carriers is secured.

Therefore, in the case of a conventional actuator, since the size of the actuator itself becomes enlarged, it can be said that it is difficult to be applied to an application device such as a smartphone, where size or volume is an important issue.

The above information disclosed in this Background section is only for enhancement of understanding of the background of the invention and it may therefore contain information that does not form the prior art that is already known to a person of ordinary skill in the art.

SUMMARY

The present invention has been devised to solve the above-mentioned problems in the background as described above, and is directed to providing an actuator for driving zoom that can more effectively implement the spatial utilization of the actuator as well as more stable driving of each carrier.

In addition, the present invention is directed to providing an actuator for driving zoom capable of minimizing noise and impact caused by impact when a carrier is moved and a carrier and a housing are in contact with each other.

In addition, the present invention is directed to providing an actuator for driving zoom capable of preventing collision due to mutual interference between two carriers by limiting the separation distance between the two carriers.

Other objects and advantages of the present invention may be understood from the following description, and will become more clearly understood by the embodiments of the present invention. In addition, the objects and advantages of the present invention can be realized by the configurations shown in the claims and the combination of the configurations.

The present invention provides an actuator for driving zoom including a first carrier including: a first mounter on which a first lens assembly is mounted, a first supporting part provided on one side of the first mounter and extending in a first direction, and a first guider provided on the other side of the first mounter and extending in the first direction; a second carrier including: a second mounter on which a second lens assembly is mounted, a second supporting part provided on one side of the second mounter and extending in a second direction opposite to the first direction, and a second guider provided on the other side of the second mounter and extending in the second direction; a first passage provided between the first mounter and the first supporting part and into which the second guider is inserted; a second passage provided between the second mounter and the second supporting part and into which the first guider is inserted; and a first damper and a second damper respectively provided on the first guider and the second guider and limiting the separation distance between the first carrier and the second carrier.

Here, the first guider includes a first connection part connected to the first mounter and a first extension part extending from the first mounter, and the second guider includes a second connection part connected to the second mounter and a second extension part extending from the second mounter.

In addition, the first damper is provided on the front surface of the first connection part, and the second damper is provided on the front surface of the second connection part.

In addition, the first supporting part includes a first groove portion through which the second damper can move, and a first stopper for limiting movement of the second damper.

In addition, the second supporting part includes a second groove portion through which the first damper can move, and a second stopper for limiting movement of the first damper.

In addition, the first damper has a first protrusion that protrudes toward the second supporting part and is seated in the second groove portion.

In addition, the second damper has a second protrusion that protrudes toward the first supporting part and is seated in the first groove portion.

In addition, the second supporting part further includes a third damper facing the first damper, and the first supporting part further includes a fourth damper facing the second damper.

In addition, the actuator for driving zoom of the present invention further includes a first magnet and a second magnet respectively mounted on the first supporting part and the second supporting part, and a first coil unit and a second coil unit respectively facing the first magnet and the second magnet.

In addition, the actuator for driving zoom of the present invention further includes a housing that accommodates the first carrier and the second carrier and includes first to fourth guide rails.

Here, the first supporting part has a first ball rail facing the first guide rail, and the first guider has a second ball rail facing the second guide rail.

In addition, the second supporting part has a third ball rail facing the third guide rail, and the second guider has a fourth ball rail facing the fourth guide rail.

According to an embodiment of the present invention, by implementing the physical structure of a plurality of carriers to be symmetrical in opposite directions to each other, it is possible to sufficiently secure the independent respective movement range of each lens (lens assembly) mounted on each carrier.

According to an embodiment of the present invention, by improving the physical structure so that a portion of each carrier intersects or overlaps with each other, independent movement of each of a plurality of carriers can be effectively ensured, and the overall structure and shape of the device can be implemented in a more space-intensive form, so it can be further optimized for minimization of the overall space and miniaturization of the mobile terminal through this.

According to an embodiment of the present invention, by providing a magnet mounting space so as to form asymmetry for each carrier based on the space in which the lens is mounted, a magnet of sufficient size can be provided in each carrier, thereby more effectively enhancing the driving force of each carrier.

According to an embodiment of the present invention, by limiting the separation distance between two carriers, it is possible to prevent the two carriers from moving in a direction away from each other to expose all the stacked guide rails, and through this, mutual interference between the two carriers does not occur, thereby preventing the two carriers from colliding with each other.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which.

DETAILED DESCRIPTION OF THE EMBODIMENTS

Figure 1:
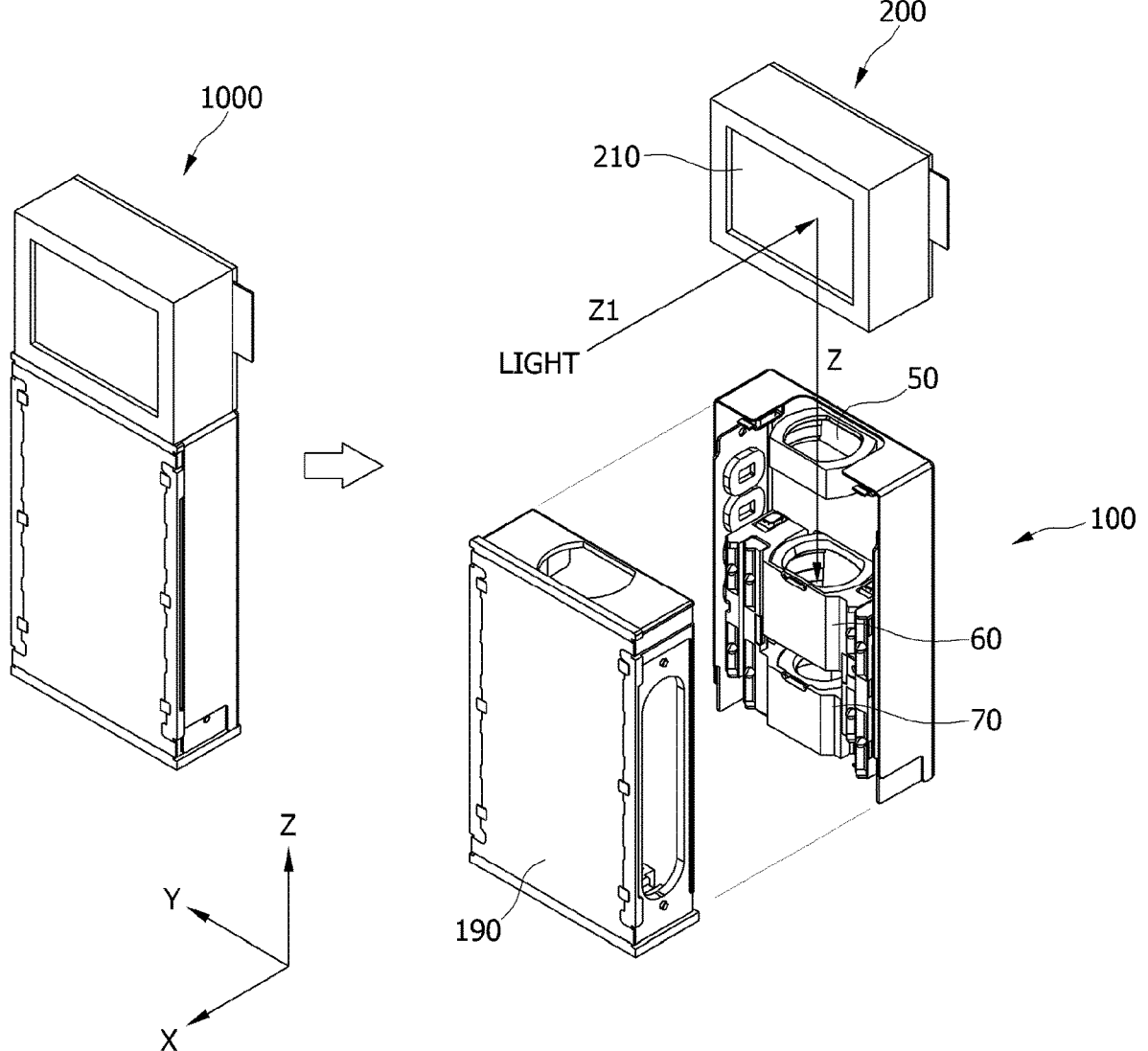
FIG. 1 is a view showing an overall configuration of an actuator for driving zoom and a camera module according to an exemplary embodiment of the present invention.

Hereinafter, preferred embodiments according to the present invention will be described in detail with reference to the accompanying drawings. Prior to this, terms or words used in the present specification and claims should not be construed as limited to their usual or dictionary definition, and they should be interpreted as a meaning and concept consistent with the technical idea of the present invention based on the principle that inventors may appropriately define the concept of terms in order to describe their own invention in the best way.

Accordingly, the embodiments described in the present specification and the configurations shown in the drawings are only the most preferred embodiments of the present invention, and do not represent all the technical spirit of the present invention, so it should be understood that there may be various examples of equivalent and modification that can replace them at the time of filing the present invention.

Figure 2:
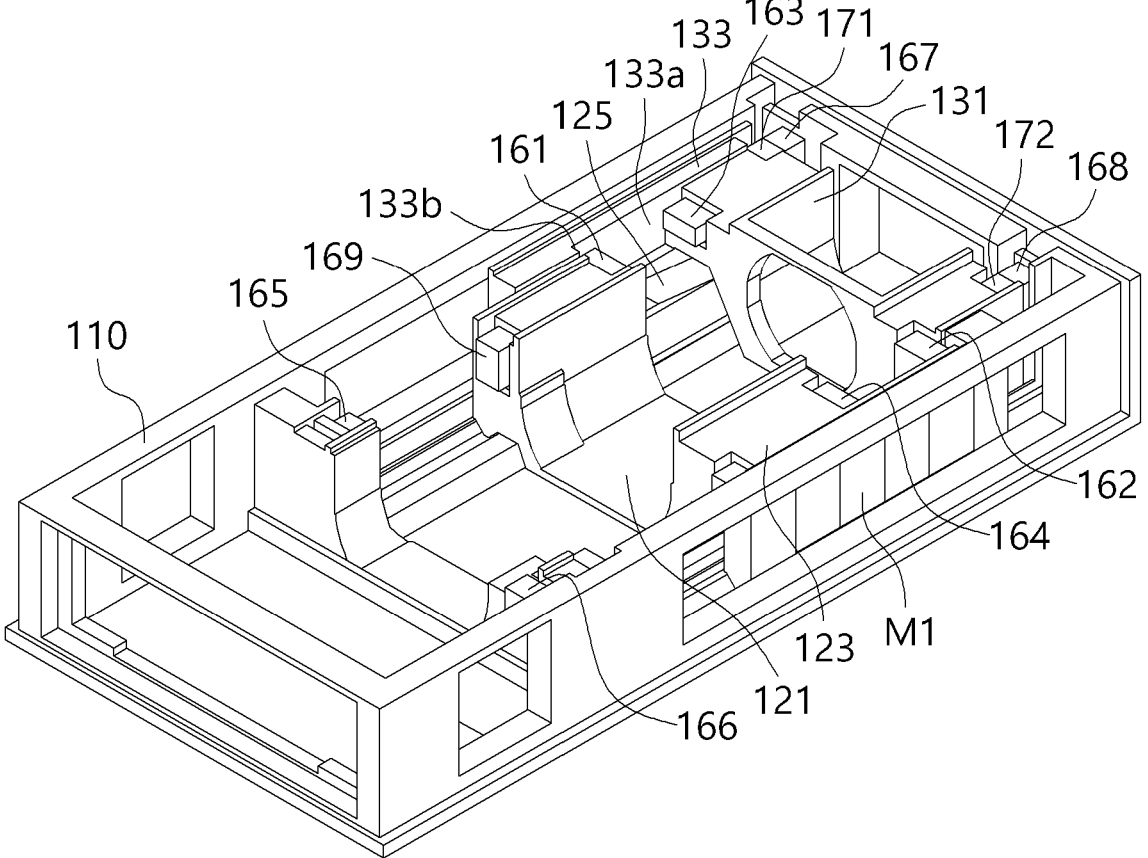
FIGS. 2 and 3 are views showing an overall configuration of an actuator for driving zoom according to an exemplary embodiment of the present invention.
Figure 3:
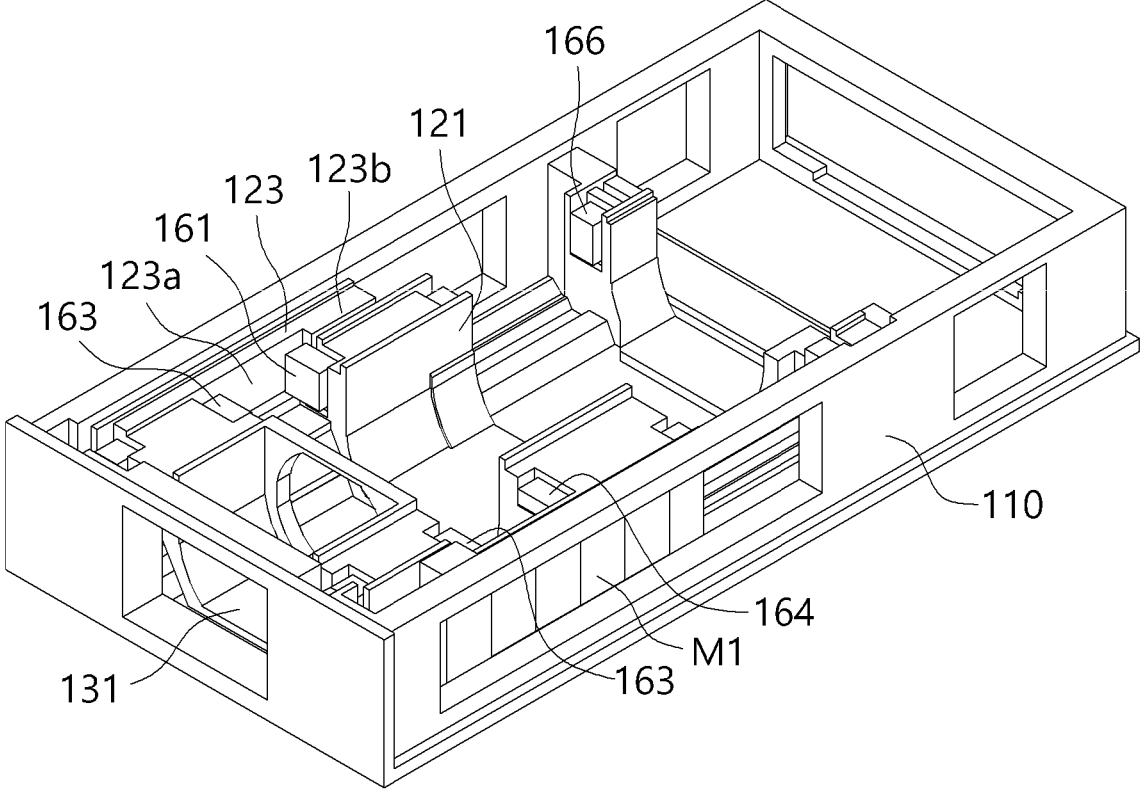

FIG. 1 is a view showing an overall configuration of an actuator for driving zoom and a camera module according to an exemplary embodiment of the present invention, and FIGS. 2 and 3 are views showing the overall configuration of an actuator for driving zoom according to an exemplary embodiment of the present invention.

Hereinafter, an overall configuration of an actuator for driving zoom according to an exemplary embodiment of the present invention will be described with reference to FIGS. 1 to 3.

The actuator for driving zoom 100 of the present invention may be implemented as a single device by itself, and may also be implemented as a camera module 1000 together with a reflectometer module 200 and the like as shown in FIG. 1.

The actuator for driving zoom 100 of the present invention corresponds to an actuator that implements auto focus (AF) or zoom by linearly moving each of a plurality of carriers on which a lens assembly is mounted, in the optical axis direction, as will be described later.

The reflectometer module 200 may be provided in front or above the actuator for driving zoom 100 (with respect to the optical axis direction), and performs a function of reflecting or refracting the light path Z1 of a subject to the path Z in the lens direction. As such, the light reflected or refracted in the optical axis direction is introduced into an image sensor such as CMOS or CCD through a lens assembly provided in the carrier.

As such, the reflectometer module 200 for changing the path of light may include a reflectometer 210 that may be formed of one selected from a mirror or a prism or a combination thereof. The reflectometer 210 may be implemented by various members capable of changing the light introduced from the outside in the optical axis direction, but is preferably implemented with a glass material in order to improve optical performance.

Since the camera module 1000 of the present invention including the reflectometer module 200 and the like is configured to refract the path of light so that the light flows in the lens direction, the device itself may be installed in the longitudinal direction instead of in the thickness direction of a portable terminal, and thus it can be optimized for miniaturization or slimming of the portable terminal without increasing the thickness of the portable terminal.

Depending on a mode for carrying out the invention, the reflectometer 210 may be configured to be rotate-moved by a driving means that generates a magnetic force, such as a magnet or a coil. As such, since when the reflectometer 210 moves or rotate-moves, the light of the subject reflected (refracted) through the reflectometer 210 may move in the ±Y direction and/or the ±X direction to be incident on the lens and the imaging device, correction in X-axis and/or Y-axis direction for handshake may be implemented.

The light of the subject reflected through the reflectometer module 200 is incident on a first lens assembly 60 and a second lens assembly 70 and the like provided inside the actuator for driving zoom 100, and in this process, the positions of each of the first lens assembly 60 and the second lens assembly 70 (with respect to the optical axis direction) are adjusted in combination, thereby implementing functions such as zoom or AF.

Depending on a mode for carrying out the invention, in order to improve optical performance such as zoom magnification of the actuator 100, a fixed lens assembly 50 may be provided in front of the actuator 100 (with respect to the optical axis direction) as illustrated in FIG. 1.

Hereinafter, in the description of the present invention, a direction axis corresponding to a path through which light is introduced into the first lens assembly 60 etc. is defined as an optical axis (Z axis), and two axes on a plane perpendicular to the optical axis (Z axis) are defined as X and Y axes.

The fixed lens assembly 50, the first lens assembly 60, and the second lens assembly 70 may be formed of one or more lenses or an optical unit and a housing, etc., however, the drawings show the fixed lens assembly 50, the first lens assembly 60, and the second lens assembly 70 on which a lens is not mounted so that the internal configuration is more clearly displayed.

The actuator for driving zoom 100 of the present invention corresponds to a basic frame structure of the actuator 100, and includes a housing 110 accommodating an internal configuration, a case 190 coupled to the housing 110 and capable of functioning as a shield can, a first carrier 120 and a second carrier 130.

The first carrier 120 on which the first lens assembly 60 is mounted and the second carrier 130 on which the second lens assembly 70 is mounted correspond to a movable body that moves linearly in the optical axis direction (Z-axis direction), respectively, and the housing 110 from a relative point of view corresponding to this corresponds to a fixed body.

The second lens assembly 70 is mounted on the second carrier 130 so that the second lens assembly 70 is positioned above or below the first lens assembly 60 with respect to the optical axis direction, and in this state, the second carrier 130 linearly moves in the optical axis direction.

As will be described later, a first magnet M1 is provided on the first carrier 120, and a first coil unit (not shown) facing the first magnet M1 and providing a driving force to the first magnet M1 is provided on the housing 110.

When power of an appropriate magnitude and direction is applied to the first coil unit under the control of a first driving driver (not shown), an electromagnetic force is generated between the first coil unit and the first magnet M1, and the first carrier 120 is moved forward and backward in the optical axis direction by the generated electromagnetic force. The first coil unit and the like may be provided on the open surface of the housing 110 in the form of being mounted on a circuit board.

From a similar point of view, when the second driving driver (not shown) controls so that power of an appropriate size and direction is applied to the second coil unit (not shown), the second carrier 130 is linearly moved in the optical axis direction by the electromagnetic force generated between the second magnet M2 provided in the second carrier 130 and the second coil unit. The second coil unit and the like may be provided on the open surface of the housing 110 in the form of being mounted on a circuit board.

Although the drawing shows the first carrier 120 on which the first lens assembly 60 is mounted and the second carrier 130 on which the second lens assembly 70 is mounted, this is one embodiment, and of course, a larger number of lens assemblies and carriers may be provided depending on a mode for carrying out the invention.

In the following description, for efficiency of description, two carriers provided in the actuator for driving zoom 100 are exemplified, and a carrier located at the upper (front) with respect to the optical axis direction of FIG. 2 is referred to as a first carrier 120, and a carrier located at the lower (rear) is referred to as a second carrier 130.

As such, when the first carrier 120 and the second carrier 130 linearly move in the optical axis direction, respectively, the lens assembly mounted on each carrier also moves linearly in the optical axis direction, and the AF or zoom function is implemented by the relative positional relationship between these lenses.

As described above, the fixed lens assembly 50 may be provided in front of the first lens assembly 60 depending on a mode for carrying out the invention to conform to the optical performance or specifications of the actuator for driving zoom 100.

Meanwhile, preferably, a ball is disposed between the first carrier 120 and the housing 110 and between the second carrier 130 and the housing 110 so that the first carrier 120 and the second carrier 130 can move more flexibly linearly with minimized friction force.

A yoke made of a metal material for inducing the first carrier 120 and the second carrier 130 to be in close contact with the housing 110 with the ball interposed therebetween by generating an attractive force by a first magnet M1 and a second magnet M2 is provided on the lower surface (YZ plane) of the housing 110.

Figure 4:
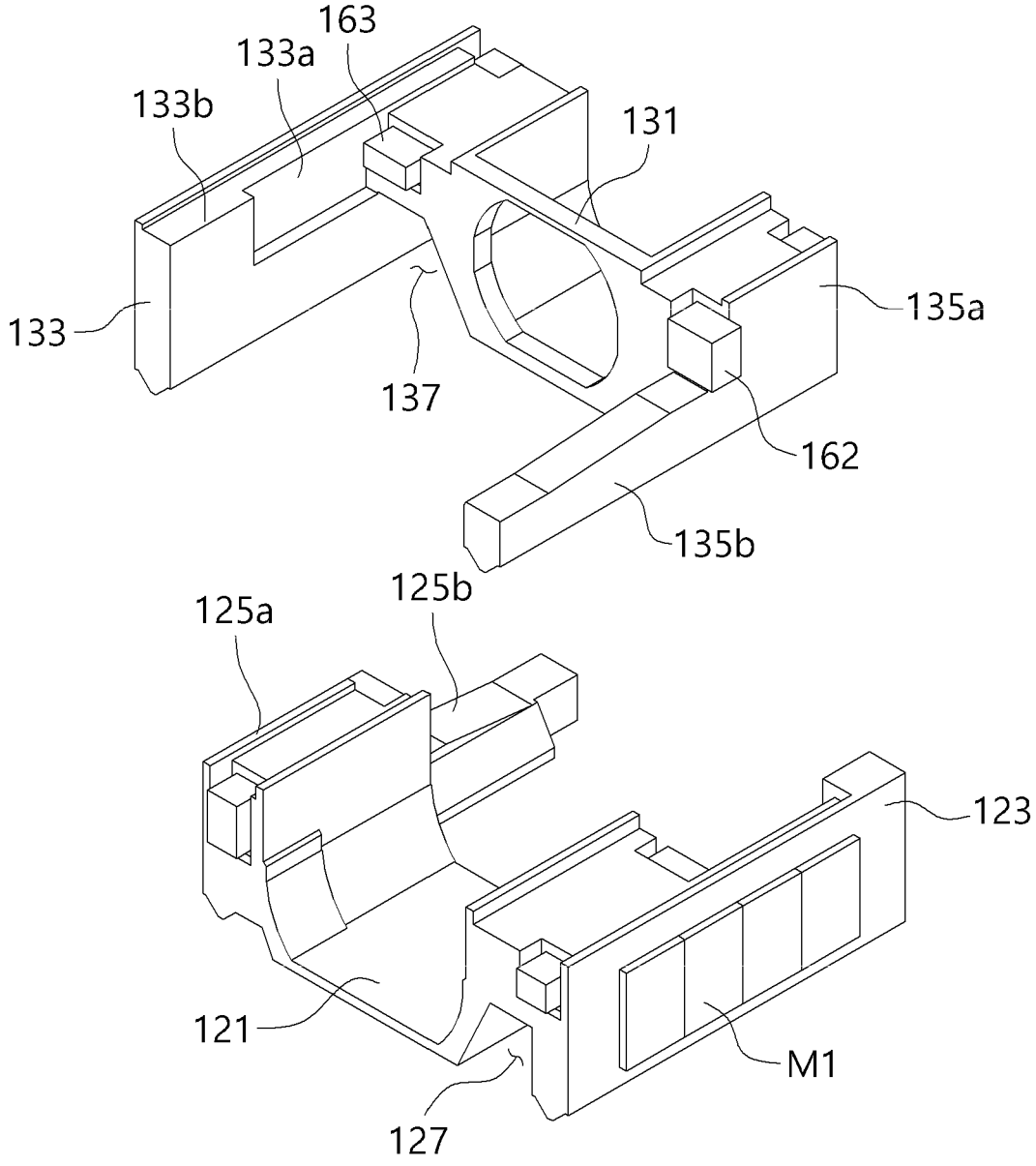
FIG. 4 is an exploded perspective view of a first carrier and a second carrier of an actuator for driving zoom according to an exemplary embodiment of the present invention.
Figure 5:
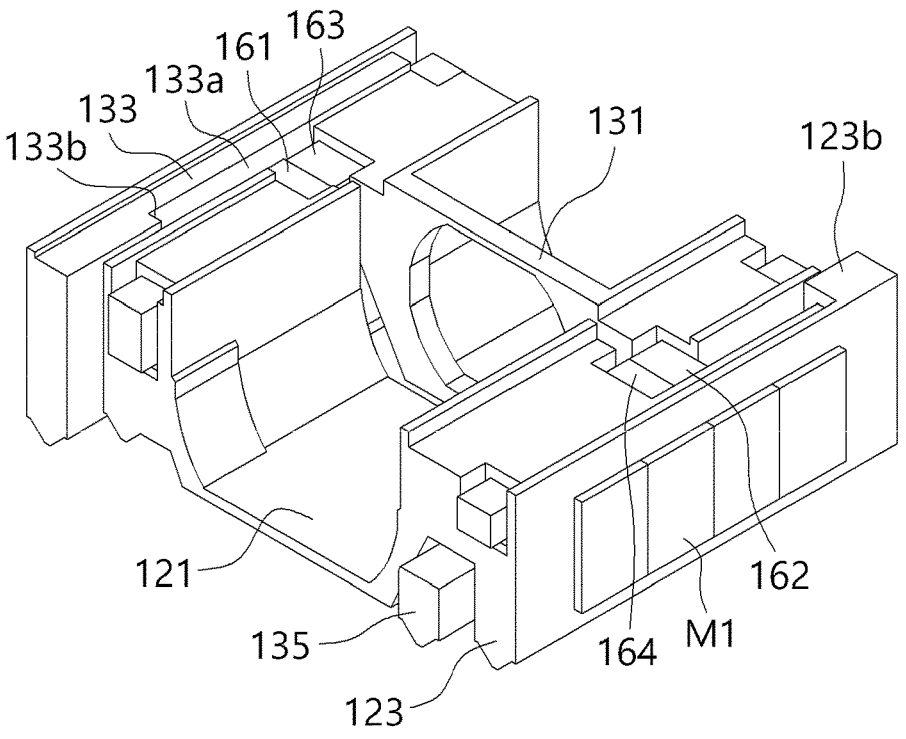
FIGS. 5 and 6 are views showing a mutual driving relationship between a first carrier and a second carrier of an actuator for driving zoom according to an exemplary embodiment of the present invention.
Figure 6:
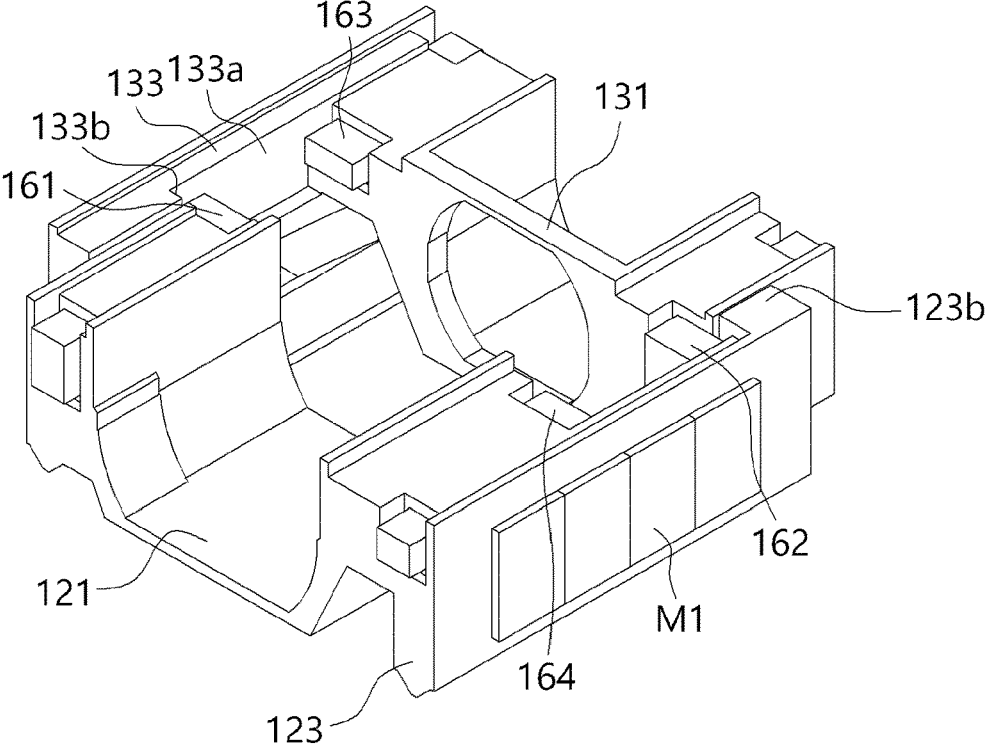
Figure 7:
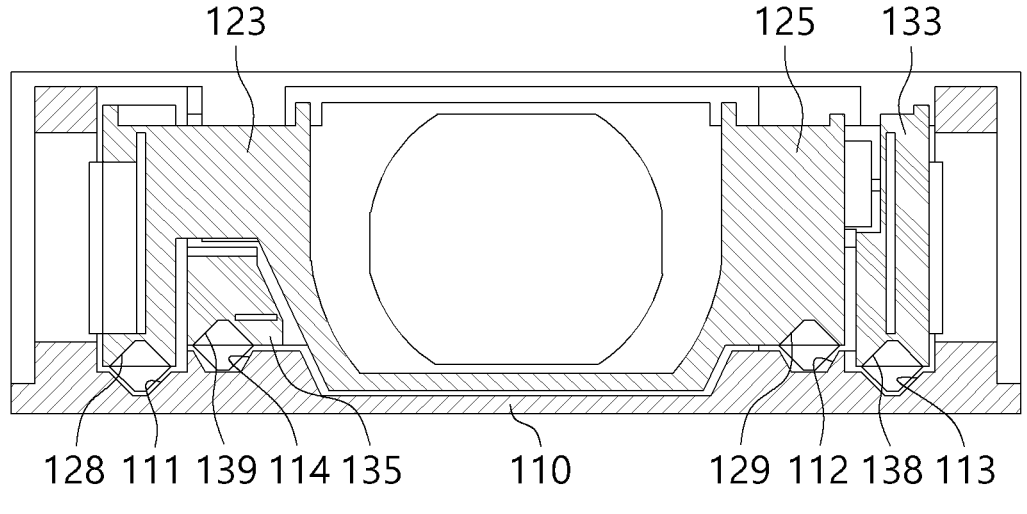
FIG. 7 is a view showing the structure of a ball rail formed on a carrier and a guide rail formed on a housing in an actuator for driving zoom according to an exemplary embodiment of the present invention.

FIG. 4 is an exploded perspective view of a first carrier and a second carrier of an actuator for driving zoom according to an exemplary embodiment of the present invention, FIGS. 5 and 6 are views showing a mutual driving relationship between a first carrier and a second carrier of an actuator for driving zoom according to an exemplary embodiment of the present invention, and FIG. 7 is a view showing the structure of a ball rail formed on a carrier and a guide rail formed on a housing in an actuator for driving zoom according to an exemplary embodiment of the present invention.

Hereinafter, a coupling relationship and a mutual driving relationship between the first carrier and the second carrier of the actuator for driving zoom according to an embodiment of the present invention will be described with reference to FIGS. 4 to 7.

As described above, the first carrier 120 on which the first lens assembly 60 is mounted is a movable body that linearly moves in the optical axis direction, and specifically, includes a first mounter 121 on which the first lens assembly 60 is mounted, a first supporting part 123 on which the first magnet M1 is mounted, and a first guider 125.

The first mounter 121 is provided with a space corresponding to the shape of the first lens assembly 60 so that the first lens assembly 60 is mounted as illustrated in the drawing, and depending on a mode carrying out the invention, a case for preventing the first lens assembly 60 from being separated in the X-axis direction or the like may be provided above the first mounter 121.

The first supporting part 123 on which the first magnet M1 is mounted is provided on one side of the left or right side of the first mounter 121 and extends in the first direction. That is, the first supporting part 123 has a shape that is more extended than the length in the optical axis direction of the first mounter 121 with respect to the optical axis direction.

The first supporting part 123 may be formed integrally with the first mounter 121, and is preferably configured to have a shape extending in any one of the optical axis directions (Z-axis direction) in order to implement a physical structure that is mutually symmetrical with the second supporting part 135 of the second carrier 130 to be described later.

As such, since the first supporting part 123 of the present invention is configured to have a shape extending in the optical axis direction, the first magnet M1 having a size corresponding to the extended area may be mounted, so that the first carrier 120 can further enhance the driving force.

In addition, a first ball rail 128 facing a first guide rail 111 formed in the housing 110 may be formed on the first supporting part 123. In this case, a ball is disposed to be accommodated between the first guide rail 111 and the first ball rail 128.

The first guider 125 is provided on the other side of the left or right side of the first mounter 121 where the first supporting part 123 is not provided, and extends in a first direction. That is, the first guider 123 may have a lower height (with respect to the X axis) than the first supporting part 123 and may be formed in a bar shape that is more extended than the length in the optical axis direction of the first mounter 121.

A second ball rail 129 facing a second guide rail 112 formed in the housing 110 is formed on the first guider 125, and a ball is disposed to be accommodated between the second guide rail 112 and the second ball rail 129 of the present invention.

As such, the first carrier 120 is located on the left and the right side, respectively, with respect to the first mounter 121, and can support stably movement in the optical axis direction of the first lens assembly 60 by the first supporting part 123 having a shape that extends from the first mounter 121 with respect to the optical axis direction and the first guider 125.

As described above, the first magnet M1 provided on the first supporting part 123 of the first carrier 120 generates an attractive force with the yoke provided on the housing 110.

Therefore, since the first carrier 120 of the present invention is in close contact with the housing 110 direction while maintaining overall equilibrium by the attractive force between the first magnet M1 and the yoke, the physical guiding by the ball can be implemented more stably.

The second carrier 130 has a physical structure corresponding to that of the first carrier 120 described above, and has a structure symmetrical to the first carrier 120 in opposite directions as shown in the drawings.

Specifically, the second carrier 130 includes a second mounter 131 on which the second lens assembly 70 is mounted, a second supporting part 133 on which the second magnet M2 is mounted, and a second guider 135.

The second supporting part 133 of the second carrier 130 is provided on one side of the left or right side of the second mounter 131, is provided in a direction opposite to the direction in which the first supporting part 123 of the first carrier 120 described above is provided, and extends in a second direction opposite to the first direction. That is, the second supporting part 133 has a shape that is more extended than the length in the optical axis direction of the second mounter 131, and has a shape extending in a direction opposite to the direction in which the first supporting part 123 of the first carrier 120 extends.

As such, the first carrier 120 and the second carrier 130 have a similar physical structure as a whole, and by placing the first mounter 121 on which the first lens assembly 60 is mounted and the second mounter 131 on which the second lens assembly 70 in the middle, a sufficient moving distance of the first and second lens assemblies 60 and 70 may be secured.

At the same time, since the first magnet M1 for driving the first carrier 120 and the second magnet M2 for driving the second carrier 130 may be installed in a relatively larger size through the first supporting part 123 and the second supporting part 133, it is possible to effectively increase the driving force.

A third ball rail 138 facing a third guide rail 113 formed in the housing 110 may be formed on the second supporting part 133, and in this case, a ball is disposed to be accommodated between the third guide rail 113 and the third ball rail 138.

The second guider 135 is provided on the other side of the left or right side of the second mounter 131 where the second supporting part 133 is not provided, and extends in a second direction. That is, the second guider 135 may have a lower height (with respect to the X axis) than the second supporting part 133 and may be formed in a bar shape that is more extended than the length in the optical axis direction of the second mounter 131.

A fourth ball rail 139 facing a fourth guide rail 114 formed in the housing 110 is formed on the second guider 135, and a ball is disposed to be accommodated between the fourth guide rail 114 and the fourth ball rail 139 of the present invention.

As such, the second carrier 130 is located on the left and the right side, respectively, with respect to the second mounter 131, and can support stably movement in the optical axis direction of the second lens assembly 70 by the second supporting part 133 having a shape that extends from the second mounter 131 with respect to the optical axis direction and the second guider 135.

The second magnet M2 provided on the second supporting part 133 of the second carrier 130 generates an attractive force with the yoke provided on the housing 110.

Therefore, since the second carrier 120 of the present invention is in close contact with the, housing 110 direction while maintaining overall equilibrium by the attractive force between the second magnet M2 and the yoke, the physical guiding by the ball can be implemented more stably.

The first carrier 120 includes a first passage 127 provided between the first mounter 121 and the first supporting part 123 and into which the second guider 135 is inserted. Here, the first passage 127 has a shape extending in the optical axis direction so that the second guider 135 of the second carrier 130 is movable.

Correspondingly, the second carrier 130 includes a second passage 137 provided between the second mounter 131 and the second supporting part 133 and into which the first guider 125 is inserted. Here, the second passage 137 has a shape extending in the optical axis direction so that the first guider 125 of the first carrier 120 is movable.

Through the physical structure of the first passage 127 of the first carrier 120 and the second passage 137 of the second carrier 130, the first guider 125 of the first carrier 120 is inserted into the second passage 137 of the second carrier 130, and the second guider 135 of the second carrier 130 is inserted into the first passage 127 of the first carrier 120.

Therefore, the first carrier 120 and the second carrier 130 of the present invention can move independently of each other, as well as some components of each can be implemented as a physical structure in the form of intersecting or stacking each other, so space utilization can be further increased.

The second guider 135 of the second carrier 130 is located in the first passage 127 of the first carrier 120, and when the second carrier 130 moves, it linearly moves in the optical axis direction while receiving the physical guiding of the ball.

In a corresponding view, the first guider 125 of the first carrier 120 is located in the second passage 137 of the second carrier 130, and when the first carrier 120 moves, it linearly moves in the optical axis direction while receiving the guiding of the ball through the second passage 137.

As such, since the physical structure is implemented in such a way that a portion of each of the first carrier 120 and the second carrier 130 is stacked or overlapped with each other, independent driving of each is guaranteed and the overall size can be reduced, so that the space utilization can be further increased.

In order to further increase the efficiency of this spatial design, it is preferable that the first passage 127 is formed between the first mounter 121 and the first supporting part 123, and the second passage 137 is formed between the second mounter 131 and the second supporting part 133.

Referring to FIG. 7, first to fourth guide rails 111, 112, 113 and 114 are formed on the bottom surface (with respect to the X axis) of the housing 110.

The first to fourth guide rails 111 to 114 are configured to guide a ball positioned between the first and second carriers 120 and 130 and the housing 110.

The first guide rail 111 faces the first ball rail 128 formed on the first supporting part 123 of the first carrier 120, and the second guide rail 112 faces the second ball rail 129 formed on the first guider 125 of the first carrier 120.

The third guide rail 113 faces the third ball rail 138 formed on the second supporting part 133 of the second carrier 130, and the fourth guide rail 114 faces the fourth ball rail 139 formed on the second guider 135 of the second carrier 130.

As described above, each of the first carrier 120 and the second carrier 130 of the present invention has a shape in which a lens mounting part and a driving magnet mounting part are dualized and a magnet mounting part is extended in the optical axis direction, and the first carrier 120 and the second carrier 130 themselves are configured to have a symmetrical physical structure with respect to different directions.

Therefore, as described above, the structure for the guide rail may be further extended in the optical axis direction, and based on this, the movement distances in the optical axis direction of the first carrier 120 and the second carrier 130 may be more effectively extended without interference or physical obstruction due to movement.

In order to realize effective guiding for linearity, the ball B is preferably provided in a form in which a portion thereof is accommodated in one or more of the ball rails 128, 129, 138 and 139 and/or the guide rails 111, 112, 113 and 114.

Figure 8:
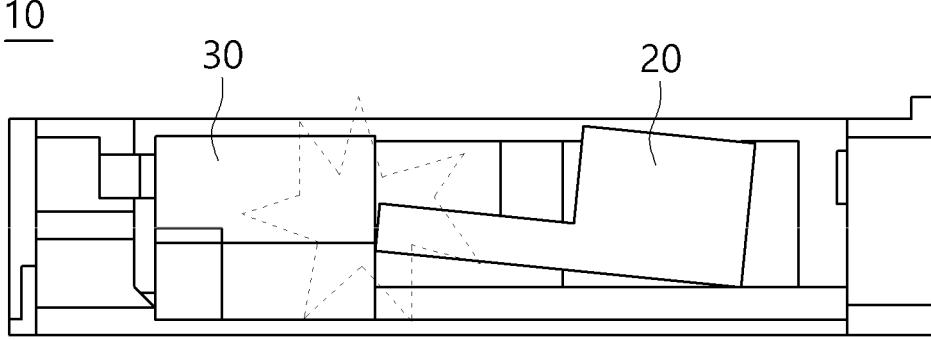
FIG. 8 is a view showing a comparative example of an actuator for driving zoom according to an exemplary embodiment of the present invention, in the case where there is no configuration limiting the separation distance between a first and second carriers.
Figures 9A, 9B:
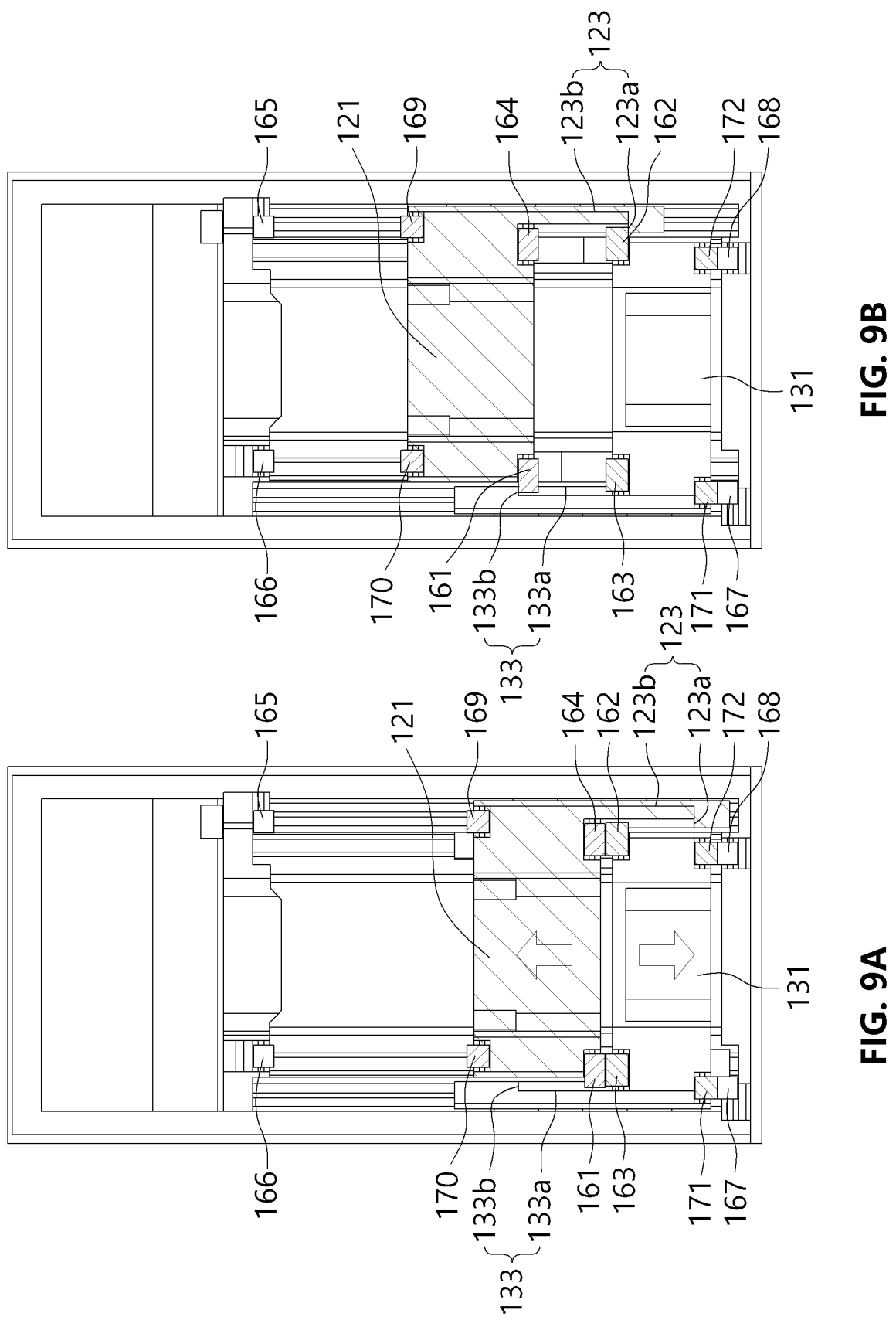
FIGS. 9A and 9B are views for explaining a configuration for limiting the separation distance between a first and second carriers of an actuator for driving zoom according to an exemplary embodiment of the present invention.

FIG. 8 is a view showing a comparative example of an actuator for driving zoom according to an exemplary embodiment of the present invention, in the case where there is no configuration limiting the separation distance between a first and second carriers, and FIGS. 9A and 9B are views for explaining a configuration for limiting the separation distance between a first and second carriers of an actuator for driving zoom according to an exemplary embodiment of the present invention.

Referring to FIG. 8, the actuator for driving zoom 10 without a configuration limiting the separation distance of the first and second carriers 20 and 30 has a risk that when the first and second carriers 20 and 30 are moved in a direction away from each other and the stacked guide rails are all exposed to the outside, and then the first and second carriers 20 and 30 are moved in a direction closer to each other again, the first and second carriers 20 and 30 collide with each other due to mutual interference between the first and second carriers 20 and 30. In addition, such a collision may adversely affect the performance of the actuator for driving zoom 10.

In order to prevent such a problem, the actuator for driving zoom 100 according to an embodiment of the present invention includes first and second dampers 161 and 162 limiting the separation distance between the first and second carriers 120 and 130.

Referring to FIGS. 4 to 6, the first guider 125 of the first carrier 120 includes a first connection part 125a connected to the first mounter 121 and a first extension part 125b extending from the first mounter 121, and the second guider 135 of the second carrier 130 includes a second connection part 135a connected to the second mounter 131 and a second extension part 135b extending from the second mounter 131.

Here, the first damper 161 is provided on the front surface of the first connection part 125b of the first guider 125, and the second damper 162 is provided on the front surface of the second connection part 135b of the second guider 135.

The first supporting part 123 of the first carrier 120 includes a first groove portion 123a through which the second damper 162 can move, and a first stopper 123b for limiting movement of the second damper 162.

The second supporting part 133 of the second carrier 130 includes a second groove portion 133a through which the first damper 161 can move, and a second stopper 133b for limiting movement of the first damper 161.

The first damper 161 includes a first protrusion 161a that protrudes toward the second supporting part 133 and is seated in the second groove portion 133a of the second supporting part 133, and the second damper 162 includes a second protrusion 162a that protrudes toward the first supporting part 123 and is seated in the first groove portion 123a of the first supporting part 123.

As such, the first protrusion 161a is seated in the second groove portion 133a to press the second supporting part 133, and the second protrusion 162a is seated in the first groove portion 123a to press the first supporting part 123, thereby capable of minimizing the lifting phenomenon of the first and second carriers 120 and 130 when the first and second carriers 120 and 130 are moved.

Referring to FIGS. 9A and 9B, in the actuator for driving zoom according to an embodiment of the present invention, when the first and second carriers 120 and 130 are moved away from each other, the first protrusion 161a of the first damper 161 is moved along the second groove portion 133*a* of the second supporting part 133 and then is caught by the second stopper 133*b*, and the movement is restricted, and the second protrusion 162*a* of the second damper 162 is moved along the first groove portion 123*a* of the first supporting part 123 and then is caught by the first stopper 123*b*, and the movement is restricted. That is, the separation distance between the first and second carriers 120 and 130 is limited.

Accordingly, the stacked guide rails (11, 114) and (112, 113) are not all exposed to the outside, and in this case, even if the first and second carriers 120 and 130 move in a direction closer to each other, mutual interference between the first and second carriers 120 and 130 does not occur, thereby capable of preventing the first and second carriers 120 and 130 from colliding with each other.

The second supporting part 133 further includes a third damper 163 facing the first damper 161, and the first supporting part 123 further includes a fourth damper 164 facing the second damper 162.

The housing 110 includes a fifth damper 165 and a sixth damper 166 inside one side, and a seventh damper 167 and an eighth damper 168 inside the other side.

In addition, the first carrier 120 includes a ninth damper 169 facing the fifth damper 165 and a tenth damper 170 facing the sixth damper 166. And, the second carrier 130 includes an eleventh damper 171 facing the seventh damper 167 and a twelfth damper 172 facing the eighth damper 168.

The first to twelfth dampers 161 to 172 may be made of an elastic material, and the dampers facing each other may have the same shape, but are not limited thereto.

When the first to twelfth dampers 161 to 172 are applied to the actuator for driving zoom 100, it is possible to minimize the amount of noise and impact caused by the impact occurring when the first and second carriers 120 and 130 collide with each other or when the first and second carriers 120 and 130 and the housing 110 collide with each other.

In the above, although the present invention has been described with reference to limited embodiments and drawings, the present invention is not limited thereto and of course can be variously modified and changed by those of ordinary skill in the art within the scope of equivalents of the technical spirit of the present invention and the claims to be described below.

In the above description of the present invention, modifiers such as first and second are only instrumental terms used to relatively distinguish components from each other, so they should not be construed as terms used to indicate a specific order, priority, or the like.

The accompanying drawings for the purpose of explaining the present invention and illustrating examples thereof may be shown in a somewhat exaggerated form in order to emphasize or highlight the technical content according to the present invention, but it should be construed as obvious that various types of modified application examples are possible at the level of those skilled in the art in consideration of the above-described contents and the matters shown in the drawings.

What is claimed is:

1. An actuator for a driving zoom, comprising:
a first carrier, comprising
    a first mounter configured such that a first lens assembly is mountable on the first mounter,
    a first supporting part configured to extend from a first side of the first mounter toward a first direction, a first guider configured to extend from a second side of the first mounter toward the first direction, the second side being opposite to the first side; and
a second carrier, comprising
    a second mounter configured such that a second lens assembly is mountable on the second mounter,
    a second supporting part configured to extend from a second side of the second mounter toward a second direction, the second direction being opposite to the first direction, and
    a second guider configured to connect to extend from a first side of the second mounter toward the second direction,
wherein the first direction and the second direction are defined along an optical axis,
wherein normals of the first side and the second side of the first mounter, which is aligned with the optical axis, or normals of the first side and the second side of the second mounter, which is aligned with the optical axis, are oriented toward a third direction and a fourth direction, respectively, wherein the third direction and the fourth direction are perpendicular to the optical axis and opposite to each other,
wherein a first joint structure formed by the first mounter and the first supporting part is configured to define a first passage into which the second guider is inserted,
wherein a second joint structure formed by the second mounter and the second supporting part is configured to define a second passage into which the first guider is inserted,
wherein the first guider and the second guider respectively includes a first damper and a second damper, the first damper and the second damper being configured to limit a separation distance between the first carrier and the second carrier.

2. The actuator according to claim 1, wherein the first guider comprises a first connection part connected to the first mounter and a first extension part extending from the first connection part, and
the second guider comprises a second connection part connected to the second mounter and a second extension part extending from the second connection part.

3. The actuator according to claim 2, wherein the first damper is provided on a front surface of the first connection part, and
the second damper is provided on a front surface of the second connection part.

4. The actuator according to claim 1, wherein the first damper has a first protrusion protruding towards the second supporting part and
the first protrusion is seated in the second groove portion.

5. The actuator according to claim 1, wherein the second damper has a second protrusion protruding towards the first supporting part, and
the second protrusion is seated in the first groove portion.

6. The actuator according to claim 3, wherein the second supporting part further comprises a third damper facing the first damper, and
the first supporting part further comprises a fourth damper facing the second damper.

7. The actuator according to claim 1, further comprising a first magnet and a second magnet respectively mounted on the first supporting part and the second supporting part; and
a first coil unit and a second coil unit respectively facing the first magnet and the second magnet.

8. The actuator according to claim 1, further comprising a housing accommodating the first carrier and the second carrier, wherein the housing comprises a first guide rail, a second guide rail, a third guide rail, and a fourth guide rail.

9. The actuator according to claim 8, wherein the first supporting part has a first ball rail facing the first guide rail, and the first guider has a second ball rail facing the second guide rail.

10. The actuator according to claim 8, wherein the second supporting part has a third ball rail facing the third guide rail, and the second guider has a fourth ball rail facing the fourth guide rail.

11. The actuator according to claim 1, wherein the first supporting part comprises a first groove portion through which the second damper is moveable, and a first stopper for limiting movement of the second damper.

12. The actuator according to claim 11, wherein the second supporting part comprises a second groove portion through which the first damper is moveable, and a second stopper for limiting movement of the first damper.

* * * * *